US012679955B2

(12) United States Patent
McCaffrey et al.

(10) Patent No.: US 12,679,955 B2
(45) Date of Patent: Jul. 14, 2026

(54) STARCH COMPOSITIONS

(71) Applicant: PLANTIC TECHNOLOGIES LIMITED, Altona (AU)

(72) Inventors: Nicholas John McCaffrey, Altona (AU); Masahiko Ota, Altona (AU)

(73) Assignee: PLANTIC TECHNOLOGIES LIMITED, Altona (AU)

(*) Notice: Subject to any disclaimer, the term of this patent is extended or adjusted under 35 U.S.C. 154(b) by 716 days.

(21) Appl. No.: 17/917,944

(22) PCT Filed: Apr. 23, 2021

(86) PCT No.: PCT/AU2021/050366

§ 371 (c)(1),
(2) Date: Oct. 10, 2022

(87) PCT Pub. No.: WO2021/212180

PCT Pub. Date: Oct. 28, 2021

(65) Prior Publication Data

US 2023/0138995 A1 May 4, 2023

(30) Foreign Application Priority Data

Apr. 24, 2020 (AU) ................................ 2020901287

(51) Int. Cl.
*C08L 3/08* (2006.01)
*C08J 5/18* (2006.01)

(52) U.S. Cl.
CPC . *C08L 3/08* (2013.01); *C08J 5/18* (2013.01); *C08J 2303/08* (2013.01); *C08J 2403/08* (2013.01); *C08J 2429/04* (2013.01); *C08L 2203/16* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,542,199 A | 9/1985 | Kaminsky et al. | |
| 2004/0132873 A1 | 7/2004 | Bailey et al. | |
| 2009/0143503 A1* | 6/2009 | Romero-Nochebuena | C08L 3/00 524/52 |
| 2014/0349047 A1 | 11/2014 | McCaffrey et al. | |
| 2018/0346949 A1 | 12/2018 | Kishishita et al. | |
| 2020/0339785 A1 | 10/2020 | Ota | |

FOREIGN PATENT DOCUMENTS

| | | | | |
|---|---|---|---|---|
| CN | 101914224 A | 12/2010 | | |
| EP | 1887036 A2 | 2/2008 | | |
| JP | 2000327840 A | 11/2000 | | |
| JP | 2007056206 A | 3/2007 | | |
| JP | 2008517108 A | 5/2008 | | |
| WO | WO-9308014 A1 * | 4/1993 | | B65D 81/051 |
| WO | 2006042364 A1 | 4/2006 | | |
| WO | 2014043744 A1 | 3/2014 | | |
| WO | 2015157823 A1 | 10/2015 | | |
| WO | 2017094895 A1 | 6/2017 | | |

OTHER PUBLICATIONS

International Search Report and Written Opinion issued in corresponding International Patent Application No. PCT/AU2021/050366 mailed Jul. 7, 2021 (12 pages).
W. Banks, et al., "Studies on Starches of High Amylose Content," Jahrgang, Die Starke, Sep. 1974, vol. 26, No. 9, pp. 289-300.
Extended European Search Report issued in corresponding European Patent Application 21793480.1 dated Sep. 21, 2023 (23 pages).
Office Action issued in corresponding Japanese Patent Application 2022-564416 issued May 27, 2025 (11 pages).

* cited by examiner

*Primary Examiner* — Katarzyna I Kolb
(74) *Attorney, Agent, or Firm* — Kilyk & Bowersox, P.L.L.C.

(57) ABSTRACT

Provided herein are starch compositions, which comprise a first starch having a first weight average molecular weight between about 300,000 and about 4,000,000 Daltons, a second starch having a second weight average molecular weight between about 1,000 and about 290,000 Daltons, and a water-soluble polymer. Also provide herein are articles of manufacture and films comprising the starch composition, and methods of making the starch composition.

19 Claims, No Drawings

STARCH COMPOSITIONS

The present application is a National Stage Application of PCT/AU2021/050366, filed Apr. 23, 2021, which claims priority to Australian Patent Application No. 2020901287, filed Apr. 24, 2020.

FIELD

The present disclosure relates to starch compositions and methods for their preparation. The compositions comprise both high molecular weight and low molecular weight starch components and a water-soluble polymer. The compositions may be formed into films having advantageously high gas barrier. The starch compositions find use in a wide range of applications, particularly, but not exclusively, in the manufacture of thin films for packaging.

BACKGROUND

Limiting the exposure of oxygen-sensitive food products to oxygen maintains and enhances the quality and shelf-life of the product. For instance, by limiting the oxygen transmission from the environment into the oxygen sensitive food products in a packaging system, the quality of the food product is maintained, and food spoilage is avoided. In addition, high oxygen barrier packaging also keeps the product in inventory longer, thereby reducing costs incurred from waste and restocking.

Plastics continue to expand into food packaging applications traditionally served by metal and glass materials. An important packaging application area for polymeric materials is in packaging oxygen-sensitive food and beverage products. Polymers used for these applications, either as films or rigid containers, can be classified by their relative permeation to oxygen. Of the many classes of polymers for such applications, those generally held to be high oxygen barrier materials include poly(ethylene vinyl alcohol) (EVOH), poly(vinylidene chloride) (PVDC), and acrylonitrile polymer (PAN).

However, EVOH is relatively expensive, and, from a renewable standpoint, EVOH is fully derived from fossil fuels.

Starch has received considerable attention in food packaging systems, both in view of its relatively low cost and its renewable nature. Particularly, melt processed starch compositions have been demonstrated to possess useful oxygen barrier properties and have been utilized in the fabrication of multilayer films (see, for example, WO 2013/090973).

Advances in starch based formulations include the use of chemically modified starch (for example, hydroxypropylated starch), variation of starch amylose content and the use of fillers or nanomaterials to influence gas barrier properties.

Despite such advances there remains a need to provide starch compositions that possess desirable characteristics, particularly characteristics that impart advantageous mechanical and gas barrier performance in thin films. The present disclosure addresses this need.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

In one aspect, the present disclosure provides a starch composition comprising:

a) from about 60% to about 99% by weight of a first starch, said first starch comprising one or more of unmodified starch and modified starch, said first starch having a first weight average molecular weight between about 300,000 and about 4,000,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 0.5% to about 40% by weight of at least one water-soluble polymer comprising one or more of polyvinyl alcohol, polyvinyl acetate and polyoxyalkylene.

First Starch

In some embodiments, the first starch is present in an amount from about 70% to about 99% by weight, or from about 75% to about 99% by weight, or from about 80% to about 99% by weight, or from about 85% to about 99% by weight, or from about 90% to about 99% by weight, or from about 95% to about 99% by weight.

In some embodiments, the first weight average molecular weight is between about 300,000 and about 3,500,000 Daltons, or between about 300,000 and about 3,000,000 Daltons, or between about 300,000 and about 2,500,000 Daltons, or between about 300,000 and about 2,000,000 Daltons, or between about 300,000 and about 1,500,000 Daltons, or between about 300,000 and about 1,000,000 Daltons, or between about 300,000 and about 900,000 Daltons, or between about 300,000 and about 800,000 Daltons, or between about 300,000 and about 700,000 Daltons, or between about 300,000 Daltons and about 600,000 Daltons.

The molecular weight of starch is influenced by the amylose/amylopectin ratio. As amylose has a lower weight average molecular weight than amylopectin, starches having higher amounts of amylose will have lower weight average molecular weight. A discussion on the molecular weight of starch in relation to amylose content may be found in Suortti et al, J. Chromat. A, 1998, 828, 515-521.

Second Starch

In some embodiments, the second starch is present in an amount from about 0.1% to about 35% by weight, or from about 0.2% to about 30% by weight, or from about 0.5% to about 25% by weight, or from about 0.5% to about 20% by weight, or from about 0.5% to about 15% by weight, or from about 0.5% to about 10% by weight, or from about 0.5% to about 5% by weight.

In some embodiments, the second weight average molecular weight is between about 10,000 and about 290,000 Daltons.

In some embodiments, the second weight average molecular weight is less than about 200,000 Daltons, or less than about 100,000 Daltons, or less than about 50,000 Daltons.

In some preferred embodiments, the second weight average molecular weight is between about 10,000 and about 50,000 Daltons.

In other preferred embodiments, the second weight average molecular weight is between about 100,000 and about 290,000 Daltons.

The weight average molecular weight of the second starch (and the first starch) may be determined by any suitable method. For example, it may be determined by gel permeation chromatography.

Suitable starch components for the second starch may be prepared by methods well known in the art, for example through hydrolysis of higher molecular weight starch components. Hydrolysis may be effected by acid, such as weak acid. Hydrolysis may also be effected by enzymes. In some embodiments, the second starch is a starch which has been treated to reduce molecular weight. In some embodiments, the second starch is a starch which has been treated with an enzyme or with an acid to reduce molecular weight.

In some embodiments, the molecular weight distribution of the starch composition is greater than 6.5.

In some embodiments, the first and second starch and/or modified starch may comprise one or more of wheat starch, corn starch, tapioca starch, potato starch, cassava starch, pea starch, oat starch, arrowroot starch, and rice starch.

In some embodiments the modified starch, when present, may be based on the same starch as the unmodified starch.

In other embodiments, the modified starch may be based on a different starch to the unmodified starch.

In some embodiments, the first starch may be a single starch. The single starch may be an unmodified starch or a modified starch.

In other embodiments, the first starch may be a mixture of two or more starches. The two or more starches may be unmodified or modified starches or mixtures thereof. Alternatively, or additionally, the two or more starches may have the same or different amylose contents.

In some embodiments, the second starch may be a single starch. The single starch may be an unmodified starch or a modified starch.

In other embodiments, the second starch may be a mixture of two or more starches. The two or more starches may be unmodified or modified starches or mixtures thereof. Alternatively, or additionally, the two or more starches may have the same or different amylose contents.

In some embodiments, the amylose content of the second starch is less than 20% by weight, less than 10% by weight, or less than 5% by weight.

In some embodiments, the amylose content of the first and second starches is, independently, greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

In some embodiments, the amylose content of the first and second starches is, independently, from about 50% to about 80% by weight.

In other embodiments, the first starch has an amylose content of greater that 20% by weight, or greater than about 30% by weight, or greater than about 40% by weight, or greater than about 50% by weight, or greater than about 60% by weight, or greater than about 70% by weight, or greater than about 80% by weight and the second starch has an amylose content of less than 20% by weight, or less than 10% by weight or less than 5% by weight, or less than 2% by weight.

It should be understood that, as used herein, "amylose content" of the first and second starch refers to the average amylose content of all starches comprising the first or second starch.

In some embodiments, the modified starch is chemically modified so as to replace hydroxyl functionality with functionality selected from the group consisting of ethers and esters and mixtures thereof.

Preferred esters comprise heptanoate or lower homologues. Particularly preferred esters include acetate.

In some embodiments, the chemically modified starch may be modified to include a hydroxyalkyl $C_{2-6}$ group or modified by reaction with an anhydride of a carboxylic acid. Preferably the modified starch may be modified to include a hydroxy $C_{2-4}$ group. More preferably the modified starch may be modified to include a hydroxy propyl group.

In some embodiments, the chemically modified starch may be modified so as to have a degree of substitution from 0.01 to 3.0, or from 0.01 to 2.5, or from 0.01 to 2.0, or from 0.01 to 1.5. The degree of substitution defines the average number of substituents per anhydroglucose unit. Accordingly, by definition, the maximum possible degree of substitution of starch is 3.0.

A preferred first starch comprises a maize starch having an amylose content of greater than or equal to 50% by weight. High amylose starches can also be obtained from tubers and grains, such as potato, pea and barley (see for example, Banks et al, Studies on Starches of High Amylose Content, Die Starke, 1974, No. 9, p 289-300).

A preferred modified starch is a hydroxypropylated starch. Other substituents may be hydroxyethyl or hydroxybutyl to form hydroxyether substitutions, or anhydrides such as maleic, phthalic or octenyl succinic anhydride can be used to produce ester derivatives.

Another preferred modified starch is a hydroxypropylated starch wherein the starch has an amylose content of greater than or equal to 50% by weight. A preferred modified starch component is a hydroxypropylated high amylose starch, for example ECOFILM™ or Gelose™ A939, both marketed by Ingredion.

Water-Soluble Polymer

The water-soluble polymer is present in an amount from about 1% to about 40% by weight.

In some embodiments, the water-soluble polymer is present in an amount from about 3% to about 30% by weight, or from about 5% to about 25% by weight.

The water-soluble polymer component of the starch composition is preferably biodegradable. In some embodiments, it has a low melting point compatible with the processing temperatures for starch.

Exemplary, but non-limiting, water-soluble polymers may be selected from the group consisting of polyvinylacetate, polyvinyl alcohol, polyalkylene oxide or mixtures thereof. Polyvinyl alcohol and polyethylene oxide and mixtures thereof are preferred water soluble polymers.

In some embodiments, the starch composition comprises a polyvinyl alcohol in an amount in the range of from about 5% to about 20% by weight, or from about 7.5% to about 12.5% by weight, or from about 10% to about 15% by weight, or from about 12.5% to about 17.5% by weight, or about 9%, about 10%, about 11%, about 12%, about 13%, about 14%, or about 15% by weight.

In some embodiments, the starch composition comprises a polyethylene oxide in an amount in the range of from about 0.2% to about 10% by weight, or from about 0.3% to about 5% by weight, or from about 0.3% to about 2% by weight, or from about 0.4% to about 1% by weight.

In some embodiments, the water-soluble polymer is a mixture of polyvinyl alcohol and polyethylene oxide. In some embodiments, the water soluble polymer comprises a polyvinyl alcohol in an amount in the range of from about 5% to about 20% by weight, and a polyethylene oxide in an amount in the range of from about 0.3% to about 5% by weight. In some embodiments, the water soluble polymer comprises a polyvinyl alcohol in an amount in the range of from about 7.5% to about 12.5% by weight, and a polyethylene oxide in an amount in the range of from about 0.3% to about 2% by weight.

The degree of saponification of the polyvinyl alcohol is preferably 80 to 99.8 mol %. The degree of saponification is more preferably 85 mol % or more, more preferably 88 mol % or more. As used herein, the degree of saponification refers to a molar fraction of hydroxyl groups with respect to the total of hydroxyl groups and ester groups in polyvinyl alcohol.

The polyvinyl alcohol may further comprise other monomer units than vinyl alcohol units. Other monomer units include monomer units derived from ethylenically unsaturated monomers and the like. Ethylenically unsaturated monomers include: α-olefins such as ethylene, propylene, isobutylene, 1-hexene; acrylic acid and its salts; unsaturated monomers having methacrylate ester groups; acrylamide, N-methylacrylamide, N,N-dimethylacrylamide, diacetolylamide propanesulfonate and its salts; methacrylamide, N-methylmethacrylamide N-ethylmethacrylamide, propanesulfonate and its salts (e.g., quaternary salts); methylvinyl ether, ethylvinyl ether, n-propylvinyl ether, i-propylvinyl ether, vinyl ethers such as i-butylvinyl ether, t-butylvinyl ether, dodecylvinyl ether, and 2,3-diacetoxy-1-vinyloxypropane; vinyl chlorides such as acrylonitrile and methacrylonitrile; vinylides such as vinylidene chloride and vinylidene fluoride; allyl compounds such as allyl acetate, 2,3-diacetoxy-1-aryloxypropane, and allyl chlorides; maleic acid, unsaturated dicarboxylic acid and its salts or esters; vinyl isopropenyl acetate; vinyl acetate, vinyl propionate, vinyl butyrate, vinyl pivalanate, vinyl chaprolate, vinyl carrylate, vinyl laurylate, vinyl palmitate, vinyl stearate, vinyl ester monomers such as vinyl oleate, vinyl benzoate are exemplified. Monomer units derived from unsaturated monomers that have not been saponified are also included in the other monomer units. The content of the other monomer units is preferably 10 mol % or less, more preferably 5 mol % or less.

The method for producing the polyvinyl alcohol is not particularly limited. For example, vinyl alcohol monomers and optionally other monomers may be polymerized, and the resulting polymer may be saponified and converted to vinyl alcohol units.

Examples of the polymerization methods include batch polymerization, semi-batch polymerization, continuous polymerization, semi-continuous polymerization, and the like. Methods of polymerization include known methods such as bulk polymerization, solution polymerization, suspension polymerization, and emulsion polymerization. Known methods can be applied to the saponification of the polymer. For example, it can be carried out in a state in which the polymer is dissolved in an alcohol or a water-containing alcohol. The alcohol that can be used at this time is preferably a lower alcohol such as methanol or ethanol, for example.

The polyvinyl alcohol preferably has a viscosity of 1 mPa·s or more, more preferably 2 mPa·s or more, more preferably 3 mPa·s or more, preferably 45 mPa·s or less, more preferably 35 mPa·s or less, of a 4% aqueous solution measured according to JIS Z 8803 at 20° C.

The polyoxyalkylene represents a polyalkylene oxide and a polyalkylene glycol, and comprises units represented by the following formula (1). The polyoxyalkylene may have two or more different units (1).

$$-\!\!\left[R-O\right]_n\!\!- \quad (1)$$

wherein R is an alkylene group and n is 1 or more.

In the formula (1), the alkylene group, for example, ethylene group, propylene group, trimethylene group, butylene group, isobutylene group, pentylene group, hexylene group, hexylene group, octylene group, nonylene group, alkylene group carbon atomic number of the decylene group or the like is 2 to 10. Among these, an alkylene group having 2 to 6 carbon atoms is preferable, and an ethylene group and/or a propylene group are more preferable. When n is 2 or more, these alkylene groups can be used alone or in combination of two or more kinds. As alkylene groups, methylene groups, ethylene groups, propylene groups, butylene groups are preferred.

In the formula (1), n is preferably 5 or more, more preferably 50 or more, more preferably 100 or more, preferably 120,000 or less, more preferably 70,000 or less. When the polyoxyalkylene contains different units, the number of repeats n of each building block may be the same or different.

The polyalkylene oxide includes, for example, a polymer having a structural unit derived from an alkylene oxide having 2 to 6 carbon atoms, and specifically includes polyethylene oxide, polypropylene oxide, polytrimethylene oxide (polyoxetane), polybutylene oxide, polyisobutylene oxide, or copolymers of monomers constituting these. The polyalkylene glycol includes, for example, a polymer having a structural unit derived from an alkylene glycol having 2 to 6 carbon atoms, and specifically includes polyethylene glycol, polypropylene glycol, polytrimethylene glycol, polybutylene glycol, polyisobutylene glycol, or a copolymer of monomers constituting these. Among these, the polyoxyalkylene is preferably polyethylene oxide, polypropylene oxide, polyethylene glycol, polypropylene glycol, or a copolymer of monomers constituting these. As the copolymer, a copolymer of ethylene oxide and propylene oxide, a copolymer of ethylene glycol and propylene glycol, or the like is preferable.

The polyoxyalkylene may contain a unit derived from another monomer other than the unit (1). When the polyoxyalkylene is a copolymer, the polymer form of the copolymer is not particularly limited, and may be random, block, graft, or tapered.

The weight average molecular weight of the polyoxyalkylene is preferably 10,000 or more, more preferably 50,000 or more, preferably 5,000,000 or less, more preferably 3,000,000 or less.

A commercially available polyoxyalkylene can also be used. Examples of typical commercial products of polyoxyalkylene (C) include Alcox™ E-75G, Alcox™ L-11, Alcox™ L-6, Alcox™ EP1010N, and Peo™ PEO-1, PEO-2, manufactured by Meisei Chemical Works.

Water

In some embodiments, the starch composition may comprise water, preferably up to 20% by weight water, more preferably up to 12% by weight water. In some embodiments, the water may serve as a plasticizer. In some embodiments water may be the only plasticizer present in the composition.

Plasticizers

In some embodiments, the starch composition further comprises at least one plasticizer other than water.

The starch composition may comprise one or more polyol plasticizers, for example up to 50% by weight of one or more polyol plasticizers, or up to 25% by weight of one or more polyol plasticizers. Exemplary, but non-limiting, polyol plasticizers may be selected from the group consisting of sorbitol, glycerol, maltitol, mannitol, xylitol, erythritol, ethylene glycol, diethylene glycol and mixtures thereof.

The starch composition may comprise less than 5% by weight of polyol plasticizers. In some embodiments, the starch composition may be substantially free of polyol plasticizers.

A range of plasticizers and humectants are useful additions to the starch composition, in order to aid processing and control and stabilize mechanical properties, in particular in reducing dependency on moisture content and relative humidity. The desired plasticizer content depends primarily on the required processing behaviour during extrusion and any subsequent blowing or stretching processes as well as on the required mechanical properties of the end product.

The plasticizer plays a triple role:

1. it provides suitable rheology for the extrusion compounding process
2. it positively affects the mechanical properties of the product and,
3. it may act as an anti-retrogradation or anti-crystallizing agent.

Sorbitol, glycerol and maltitol blends are particularly suitable for modifying the mechanical properties of the formulation, as is xylitol and blends of xylitol with sorbitol and glycerol. The larger the number of OH groups, the more effective the plasticizer is in reducing crystallisation. Sorbitol, maltitol and xylitol are particularly good humectants. Glycerol helps dissolve polyvinyl alcohol during processing. Crystallisation is observed when sorbitol is used on its own. Some polyols (sorbitol and glycerol in particular) may exhibit migration to the surface, where either an opaque crystalline film may form in the case of sorbitol, or an oily film in the case of glycerol. Blending various polyols inhibits this effect to varying degrees. Stabilisation may be enhanced with the addition of glycerol monostearate and sodium stearoyl lactylate as emulsifiers.

Other Plasticizers

Polyethylene glycol compounds may be used as emulsifying agents, plasticizers or humectants. Polyethylene oxide and polyethylene glycol alternately or together may also provide an increased water resistance.

An alternative plasticizer is epoxidized linseed oil or epoxidized soybean oil. Being hydrophobic these additives may improve moisture sensitivity of the material. These plasticizers, preferably stabilized with an emulsifying system, aid processing but do not result in a significant further reduction in Young's modulus. Other plasticizers more commonly used in the PVC industry may be suitable, including tributyl citrate, 2,2,4 trimethyl-1,3-pentanediol diisobutyrate, and acetyl tri-ethyl citrate.

Up to 20% of a humectant or water binding agent or gelling agent which may act as a (co)plasticizer may be present in the starch composition, such as carrageenan, xanthan gum, gum arabic, guar gum or gelatine. Other humectants may be used such as sugar or glucose. Biopolymers such as carrageenan, typically used in food products as thickeners and partially soluble in cold water, fully soluble in hot water, are suitable to tailor mechanical properties. By binding water these components may have a significant plasticizing function. Gelatine may be added to improve the mechanical properties and reduce moisture sensitivity. Xanthan Gum has a high water holding capacity and also acts as an emulsifier and in starch compositions has an anti-retrogradation effect. Gum Arabic may also be used as a texturiser and film former, and the hydrophilic carbohydrate and hydrophobic protein enable its hydrocolloid emulsification and stabilization properties. Guar gum has similar anti-crystallisation effects in starch compositions. Another suitable humectant is glyceryl triacetate.

Fillers or Nanomaterials

In some embodiments, the starch composition further comprises one or more fillers or nanomaterials.

In some embodiments, the amount of filler or nanomaterial is up to 20% by weight based on the total dry weight of the starch composition. The filler or nanomaterial may be present in an amount up to 10%, or up to 5%, or up to 3% by weight, based on the total weight of the starch composition.

In some embodiments, the filler or nanomaterial is at least partially exfoliated within a starch nanocomposite.

In some embodiments, the filler or nanomaterial includes clays, carbon nanotubes, cellulose nanowhiskers and chitin whiskers.

In some embodiments, the clay includes montmorillonite, bentonite, beidelite, mica, hectorite, saponite, nontronite, sauconite, vermiculite, ledikite, magadite, kenyaite, stevensite, volkonskoite or mixtures thereof.

In some embodiments, the filler or nanomaterial is hydrophobically or hydrophilically modified.

In some embodiments, the filler or nanomaterial comprises modified clay, particularly hydrophobically modified layered silicate clay.

A 'hydrophobically modified layered silicate clay' or 'hydrophobic clay' is preferably a clay modified by exchange with a surfactant comprising long chain alkyl groups. A long chain alkyl group may comprise greater than 4, or 5, or 6 carbon atoms per chain. Preferably the alkyl groups do not contain polar substituents. Preferred surfactants comprise long chain alkylammonium ion, for example, mono- or di-$C_{12}$-$C_{22}$ alkylammonium ion. Preferably, polar substituents such as hydroxyl or carboxyl are not attached to the long chain alkyl. Examples of suitable hydrophobically modified clays include NANOMER I.40P or NANOMER I.38P from Nanocor, Inc or CLOISITE® 20A or CLOISITE® 10A from BYK-Chemie GmbH.

In some embodiments, the filler or nanomaterial is present in an amount up to 10%, or up to 5%, or up to 3% by weight, based on the total weight of the starch composition.

Fatty Acid and/or Fatty Acid Salt

In a further embodiment, the starch compositions may comprise a lubricant. Preferred lubricants are C12-22 fatty acids and/or C12-22 fatty acid salts. Preferably, the C12-22 fatty acid and/or a C12-22 fatty acid salt are present in an amount up to 5% by weight.

The starch composition preferably comprises between 0.1 to 1.5% by weight of a C12-22 fatty acid and/or a C12-22 fatty acid salt. The fatty acid and/or fatty acid salt component is more preferably present in concentrations of 0.3 to 1%. Stearic acid is a particularly preferred component. Sodium and potassium salts of stearic acid may also be used. Lauric, myristic, palmitic, linoleic and behenic acids are also suitable acids.

In some embodiments, the starch composition comprises from about 75% to about 92% by weight of the first starch, from about 0.75 to about 3% by weight of the second starch, and from about 5% to about 15% of a water soluble polymer.

In some embodiments, the starch composition comprises from about 75% to about 92% by weight of the first starch, from about 0.75 to about 3% by weight of the second starch, a polyvinyl alcohol in an amount in the range of from about 7.5% to about 12.5% by weight, and a polyethylene oxide in an amount in the range of from about 0.3% to about 2% by weight.

In some embodiments, the starch composition comprises from about 75% to about 92% by weight of the first starch, from about 0.75 to about 3% by weight of the second starch, from about 5% to about 15% of a water soluble polymer (for example a polyvinyl alcohol in an amount in the range of from about 7.5% to about 12.5% by weight, and a polyethylene oxide in an amount in the range of from about 0.3% to about 2% by weight), and a filler or nanomaterial in an amount of up to 3 wt % (for example a hydrophobically modified layered silicate clay, e.g. in an amount of from 0.5 to 2.5 wt %).

In some embodiments, the starch composition comprises from about 75% to about 92% by weight of the first starch, from about 0.75 to about 3% by weight of the second starch, from about 5% to about 15% of a water soluble polymer (for example a polyvinyl alcohol in an amount in the range of from about 7.5% to about 12.5% by weight, and a polyethylene oxide in an amount in the range of from about 0.3% to about 2% by weight), and a lubricant in an amount of up to 5 wt % (for example a C12-22 fatty acid and/or a C12-22 fatty acid salt, such as stearic acid, in an amount of from 0.1 to 1.5 wt %).

In some embodiments, the starch composition comprises:

from about 75% to about 92% by weight of the first starch;

from about 0.75% to about 3% by weight of the second starch;

a polyvinyl alcohol in an amount in the range of from about 7.5% to about 12.5% by weight;

optionally a polyethylene oxide in an amount in the range of from about 0.3% to about 2% by weight;

optionally a hydrophobically modified layered silicate clay in an amount of from about 0.5% to about 2.5% by weight;

optionally a C12-22 fatty acid and/or a C12-22 fatty acid salt in an amount of from 0.1% to 1.5% by weight;

wherein the first starch is a modified starch (for example a hydroxypropylated starch); and wherein the second starch:

has a second weight average molecular weight is less than about 200,000 Daltons, or less than about 100,000 Daltons, or less than about 50,000 Daltons; and/or has an amylose content of less than 20% by weight, or less than 20% by weight, or less than 5% by weight; and/or is a starch which has been treated to reduce molecular weight, for example which has been treated with an enzyme or with an acid to reduce molecular weight.

In another aspect, the present disclosure provides an article of manufacture comprising a starch composition according to any one or more of the herein disclosed embodiments.

In another aspect, the present disclosure provides a thermoformed article comprising a starch composition according to any one or more of the herein disclosed embodiments.

In another aspect, the present disclosure provides a film comprising a starch composition according to any one of the embodiments disclosed herein.

In some embodiments, the film has a thickness between 5 and 750 microns. The film may have a thickness between 5 and 500 microns, or between 5 and 400 microns, or between 5 and 300 microns, or between 5 and 200 microns, or between 5 and 100 microns.

In some embodiments, the film has a haze of less than 25%, when measured on a 150 micron film according to ASTM D1003. The haze may be less than 20%, or less than 18%.

In some embodiments, the film has a film impact of at least 6 mN/μm measured at 50% relative humidity according to ASTM D3420.

In some embodiments, the film has an oxygen permeation coefficient of less than 0.05 cm3 mm/m2·24 h·atm at 50% relative humidity (RH), or less than 0.03 cm3·mm·/m2·day·atm, or less than 0.01 cm3 mm/m2·24 h·atm at 50% relative humidity (RH), when measured according to ASTM F1927.

In some embodiments, the film has an oxygen permeation coefficient of less than 0.05 cm3 mm/m2·24 h·atm at 75% relative humidity (RH), or less than 0.03 cm3·mm·/m2·day·atm, or less than 0.01 cm3 mm/m2·24 h·atm at 75% relative humidity (RH), when measured according to ASTM F1927.

Films comprising the first and second starches have been found to have good thermoformability properties, i.e. having the ability to be shaped into objects having a specific shape using heat. Films comprising the first and second starches have also been demonstrated to have good thermoforming draw properties.

In some embodiments, the film has a tensile elongation at break at 100° C. of at least 70%, or at least 75%, or at least 80%, or at least 85%, or at least 90%, e.g. when measured according to ASTM D638.

An area draw ratio is the ratio of the formed area of a thermoformed material following drawing compared to the initial area prior to drawing. For example, an area draw ratio may be calculated according to the formula: area draw ratio ($R_A$)=(Surface Area of thermoformed part)/(Area of film needed to produce part). The maximum area draw ratio achievable is a characteristic of the material used, and the gauge or thickness of the film or sheet used to produce the part of interest. For example, typically the thicker the gauge of film used, the higher maximum area draw ratio achievable. In some embodiments, a film comprising the first and second starches achieves a maximum area draw ratio in the range of from 2.6 to 3.8, or from 2.6 to 3.0, or from 3.0 to 3.4, or from 3.4 to 3.4 to 3.8 for films of thickness 25-75 μm. In some embodiments, a film comprising the first and second starches achieves a maximum area draw ratio in the range of from 3.0 to 4.2, or from 3.0 to 3.4, or from 3.4 to 3.8, or from 3.8 to 4.2 for films of thickness 75-125 μm. In some embodiments, a film comprising the first and second starches achieves a maximum area draw ratio in the range of from 3.8 to 5.0, or from 3.8 to 4.2, or from 4.2 to 4.6, or from 4.6 to 5.0 for films of thickness 125-175 μm. In another aspect, the present disclosure provides a multilayer film comprising at least one layer comprising a film according to any one of the herein disclosed embodiments and at least one other layer.

The at least one other layer may be selected from the group consisting of polyolefin, polyethylene terephthalate, polyethylene terephthalate glycol, polybutylene succinate, polyhydroxy butyrate, polylactic acid, nylon, polyvinylchloride, polyvinylidene dichloride, cellulose, a water-resistant protein layer, a water-resistant layer comprising silica and combinations thereof.

It has been surprisingly discovered that starch compositions possessing the herein disclosed combination of molecular weight characteristics may be processed into films which possess advantageous mechanical and gas barrier properties.

In particular, it has been surprisingly discovered that the presence of a low molecular weight starch component improves film gas barrier properties. The inventors have discovered that there is a relationship between the molecular weight of the low molecular weight starch component and the amount required to achieve a particular oxygen transmission rate. The lower the molecular weight of the low molecular weight starch component the less of this component, on a weight basis, is required in order to improve film gas barrier properties.

Accordingly, the molecular weight of the low molecular weight starch component can be varied as can the amount present in the starch composition. This provides a method of tuning gas barrier and/or mechanical property performance, depending on the requirements for end use application.

In another aspect, the present disclosure provides a method for making a starch composition, the method comprising melt processing:

a) from about 60% to about 99% by weight of a first starch, said first starch comprising one or more of unmodified starch and modified starch, said first starch having a first weight average molecular weight between about 300,000 and about 1,500,000 Daltons;
b) from about 1% to about 40% by weight of a second starch, said second starch comprising one or more of unmodified and modified starch, said second starch having a second weight average molecular weight between about 1,000 and about 290,000 Daltons; and
c) from about 1% to about 40% by weight of at least one water-soluble polymer comprising one or more of polyvinyl alcohol, polyvinyl acetate and polyoxyalkylene.

In some embodiments, the melt processing is performed at a temperature between about 80° C. to about 150° C., or between about 90° C. and about 140° C., or between about 95° C. and about 130° C.

In some preferred embodiments, the temperature of melt processing does not exceed 140° C., or does not exceed 130° C., or does not exceed 120° C., or does not exceed 110° C.

Further features and advantages of the present disclosure will be understood by reference to the following detailed description.

DETAILED DESCRIPTION

The following is a detailed description of the disclosure provided to aid those skilled in the art in practicing the present disclosure. Those of ordinary skill in the art may make modifications and variations in the embodiments described herein without departing from the spirit or scope of the present disclosure.

Although any compositions, methods and materials similar or equivalent to those described herein can also be used in the practice or testing of the present disclosure, the preferred compositions, methods and materials are now described.

It must also be noted that, as used in the specification and the appended claims, the singular forms 'a', 'an' and 'the' include plural referents unless otherwise specified. Thus, for example, reference to 'starch' may include more than one starches, and the like.

Throughout this specification, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

Unless specifically stated or obvious from context, as used herein, the term 'about' is understood as within a range of normal tolerance in the art, for example within two standard deviations of the mean. 'About' can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term 'about'.

Ranges provided herein are understood to be shorthand for all the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Applications

The herein disclosed starch compositions may be useful in a variety of applications. For example, the starch compositions may be thermoformed into articles utilizing methods well known in the art. Exemplary thermoformed articles may include trays, containers or lids. The starch compositions may also be useful as components in multilayer films, including, for example, barrier trays for extending the shelf life of perishable foods, including meat, poultry, fish, pasta, small goods, prepared meals and cheese. The starch compositions may also be useful in Modified Atmosphere Packaging (MAP) requiring control of gas permeation.

Multilayer Films

The herein disclosed starch composition may be useful in the manufacture of a multilayer films. A multilayer film may comprise:

(a) at least one layer comprising a starch composition according to any one of the aspects or embodiments as herein disclosed; and
(b) at least one other layer.

The at least one other layer may have a water vapour permeability coefficient less than 1 g·mm/$m^2$·24 hr·atm measured at 38° C. and 90% relative humidity.

The total thickness of the at least one layer comprising a starch composition may be 20% or greater than the total thickness of the multilayer film.

The water vapour permeability coefficient of the at least one other layer may be less than 0.5 g·mm/$m^2$·24 hr·atm measured at 38° C. and 90% relative humidity, or less than 0.2 g·mm/$m^2$·24 hr·atm measured at 38° C. and 90% relative humidity.

The total thickness of the at least one layer comprising a starch composition may be 30% or greater than the total thickness of the multilayer film, or 40% or greater than the total thickness of the multilayer film, 50% or greater than the total thickness of the multilayer film. The total thickness of the at least one layer comprising a starch composition may be 60% or greater than the total thickness of the multilayer film.

The starch layer may have a low oxygen permeability coefficient (OPC). The starch layer may have OPC less than 0.6 $cm^3$ mm/$m^2$·24 h·atm at 50% relative humidity (RH). The starch layer may have an OPC of less than 0.3 $cm^3$ mm/$m^2$·24 h·atm at 50% RH or an OPC of less than 0.2 $cm^3$ mm/$m^2$·24 h·atm at 50% RH. The starch layer may have an OPC of less than 0.1 $cm^3$ mm/$m^2$·24 h·atm at 50% RH or the starch layer may have an OPC of less than 0.05 $cm^3$ $mm/m^2 \cdot 24$ h·atm at 50% RH.

The starch layer may have an OPC less than 1.2 $cm^3$ $mm/m^2 \cdot 24$ h·atm at 75% relative humidity (RH). The starch layer may have an OPC of less than 0.6 $cm^3$ $mm/m^2 \cdot 24$ h·atm at 75% RH or an OPC of less than 0.2 $cm^3$ $mm/m^2 \cdot 24$ h·atm at 75% RH. The starch layer may have an OPC of less than 0.1 $cm^3$ $mm/m^2 \cdot 24$ h·atm at 75% RH or the starch layer may have an OPC of less than 0.05 $cm^3$ $mm/m^2 \cdot 24$ h·atm at 75% RH.

The OPC may remain below 0.05 $cm^3$ $mm/m^2 \cdot 24$ h·atm at 50% RH, for extended periods of time. The OPC may remain below 0.05 $cm^3$ $mm/m^2 \cdot 24$ h·atm at 50% RH for at least ten days, or the OPC may remain below 0.05 $cm^3$ $mm/m^2 \cdot 24$ h·atm at 50% RH for 20 days, or the OPC may remain below 0.05 $cm^3$ $mm/m^2 \cdot 24$ h·atm at 50% RH for thirty days. The OPC may remain below 0.05 $cm^3$ $mm/m^2 \cdot 24$ h·atm at 50% RH for thirty days.

The OPC may remain below 0.05 $cm^3$ $mm/m^2 \cdot 24$ h·atm at 75% RH, for extended periods of time. The OPC may remain below 0.05 $cm^3$ $mm/m^2 \cdot 24$ h·atm at 75% RH for at least ten days, or the OPC may remain below 0.05 $cm^3$ $mm/m^2 \cdot 24$ h·atm at 75% RH for 20 days, or the OPC may remain below 0.05 $cm^3$ $mm/m^2 \cdot 24$ h·atm at 75% RH for thirty days. The OPC may remain below 0.05 $cm^3$ $mm/m^2 \cdot 24$ h·atm at 75% RH for thirty days.

The multilayer film may have a low oxygen permeability coefficient (OPC). The multilayer film may have an OPC less than 0.6 $cm^3$ $mm/m^2 \cdot 24$ h·atm at 50% relative humidity (RH). The multilayer film may have an OPC of less than 0.3 $cm^3$ $mm/m^2 \cdot 24$ h·atm at 50% RH or an OPC of less than 0.2 $cm^3$ $mm/m^2 \cdot 24$ h·atm at 50% RH. The multilayer film may have an OPC of less than 0.1 $cm^3$ $mm/m^2 \cdot 24$ h·atm at 50% RH or the multilayer film may have an OPC of less than 0.05 $cm^3$ $mm/m^2 \cdot 24$ h·atm at 50% RH.

The multilayer film may have an OPC less than 1.2 $cm^3$ $mm/m^2 \cdot 24$ h·atm at 75% relative humidity (RH). The multilayer film may have an OPC of less than 0.6 $cm^3$ $mm/m^2 \cdot 24$ h·atm at 75% RH or an OPC of less than 0.2 $cm^3$ $mm/m^2 \cdot 24$ h·atm at 75% RH. The multilayer film may have an OPC of less than 0.1 $cm^3$ $mm/m^2 \cdot 24$ h·atm at 75% RH or the multilayer film may have an OPC of less than 0.05 $cm^3$ $mm/m^2 \cdot 24$ h·atm at 75% RH.

The OPC may remain below 0.05 $cm^3$ $mm/m^2 \cdot 24$ h·atm at 50% RH, for extended periods of time. The OPC may remain below 0.05 $cm^3$ $mm/m^2 \cdot 24$ h·atm at 50% RH for at least ten days, or the OPC may remain below 0.05 $cm^3$ $mm/m^2 \cdot 24$ h·atm at 50% RH for 20 days, or the OPC may remain below 0.05 $cm^3$ $mm/m^2 \cdot 24$ h·atm at 50% RH for thirty days. The OPC may remain below 0.05 $cm^3$ $mm/m^2 \cdot 24$ h·atm at 50% RH for thirty days.

The OPC may remain below 0.05 $cm^3$ $mm/m^2 \cdot 24$ h·atm at 75% RH, for extended periods of time. The OPC may remain below 0.05 $cm^3$ $mm/m^2 \cdot 24$ h·atm at 75% RH for at least ten days, or the OPC may remain below 0.05 $cm^3$ $mm/m^2 \cdot 24$ h·atm at 75% RH for 20 days, or the OPC may remain below 0.05 $cm^3$ $mm/m^2 \cdot 24$ h·atm at 75% RH for thirty days. The OPC may remain below 0.05 $cm^3$ $mm/m^2 \cdot 24$ h·atm at 75% RH for thirty days.

Accordingly, the multilayer films have an enhanced performance in respect of oxygen barrier properties over long periods of time. The time to reach equilibrium moisture content may be extended using controlled water vapour transmission rate other layers. The equilibrium % moisture content within the starch layer may be lower due to % relative humidity/% moisture content gradients within the other layer materials.

Such longevity in respect of gas barrier performance is clearly desirable in extending the shelf life of packaged perishable foodstuffs.

Advantageously, from a renewable perspective the multilayer film may contain a high proportion of biodegradable starch.

The thickness of the multilayer film and of each layer within the multilayer film may vary depending on the exact nature of the end use application.

The total thickness of the multilayer film may be between 5 and 1000 microns.

In some embodiments, the total thickness of the multilayer film may be between 10 and 100 microns, or between 20 and 80 microns.

In other embodiments, the total thickness of the multilayer film may be between 100 and 1000 microns or between 200 and 800 microns.

The total thickness of the at least one layer comprising a starch composition may be between 5 and 600 microns.

In some embodiments, the total thickness of the at least one layer comprising a starch composition may be between 5 and 50 microns, or between 10 and 40 microns.

In other embodiments, the total thickness of the at least one layer comprising a starch composition may be between 100 and 600 microns, or between 150 and 500 microns.

In some embodiments, the total thickness of the at least one other layer may be between 5 and 500 microns.

In some embodiments, the total thickness of the at least one other layer may be between 5 and 25 microns or between 10 and 20 microns.

In some embodiments, the total thickness of the at least one other layer may be between 30 and 400 microns, or between 30 and 300 microns.

The at least one layer comprising a starch composition may have a total thickness between 100 and 600 micron and the at least one other layer may have a total thickness between 10 and 400 micron.

The at least one layer comprising a starch composition may have a total thickness between 100 and 400 micron and the at least one other layer may have a total thickness between 40 and 250 micron.

The at least one layer comprising a starch composition may have a total thickness between 10 and 60 micron and the at least one other layer may have a total thickness between 5 and 40 micron.

The at least one layer comprising a starch composition may have a total thickness between 10 and 60 micron and the at least one other layer may have a total thickness between 5 and 500 micron.

The at least one layer comprising a starch composition may comprise water, preferably up to 20% by weight water, more preferably up to 12% by weight water. The water may serve as a plasticizer.

The moisture content of the at least one layer comprising a starch composition may be the equilibrium moisture content at the environmental % relative humidity. For example, the equilibrium moisture content may range from about 4% at low % RH to more than 15% at high % RH.

The layer comprising a starch composition and/or the other layer may comprise colourants.

Other Layer

The other layer(s) may be chosen to impart certain physical and aesthetic properties to finished multilayer film. These properties may include, for example, biodegradability in soil, water, marine or other environments, antifog, strength, heat sealability, colour, or clarity. The other layers may be those having a low water vapour transmission rate.

The at least one other layer may comprise a polyolefin, polyethylene terephthalate, polyethylene terephthalate glycol, polybutylene succinate, polyhydroxy butyrate, polylactic acid, nylon, polyvinylchloride, polyvinylidene dichloride, cellulose, a water resistant protein layer, a water resistant layer comprising silica, or mixtures thereof. Each of the other layers may comprise a mixture of components. One or more of the other layers may consist of multiple layers of different materials. Each of the other layers may comprise different materials. The layers may be solvent cast or sputter coated.

Suitable polyolefins for the preparation of the polyolefin film layer may be selected from the group consisting of ethylene homopolymers, propylene homopolymers, interpolymers of ethylene and propylene and interpolymers of ethylene or propylene with one or more $C_4$-$C_{10}$ α-olefins, cyclic olefin polymers and copolymers, biaxially orientated polypropylene, and mixtures thereof.

Suitable polyolefins may be selected from copolymers of ethylene or propylene and one or more α-olefins. Both high density polyethylenes and linear low density polyethylenes may be utilised.

Suitable linear low density polyethylenes (LLDPE) may include copolymers of ethylene and α-olefins (about 5 to about 15 wt. %). Alpha-olefins may include 1-butene, 1-hexene, 1-octene, and the like, and mixtures thereof. The density of LLDPE is within the range of about 0.865 to about 0.925 g/cm$^3$ Suitable high density polyethylenes (HDPE) may include ethylene homopolymers and copolymers of ethylene and α-olefins (about 0.1 to about 10 wt. %). Suitable alpha-olefins may include 1-butene, 1-hexene, 1-octene, and the like, and mixtures thereof. The density of HDPE is preferably from about 0.940 to about 0.970 g/cm$^3$.

Suitable cyclic olefin polymers and copolymers may include polymers of norbornene or tetracyclododecene and copolymers of norbornene or tetracyclododecene with one or more α-olefins. Examples include cyclic olefin polymers are Topas (Ticona) and Apel (Mitsui).

Blends of polyolefins and other polymers may be advantageously employed. Cast polypropylene (cPP) or biaxially oriented polypropylene (BOPP) may be chosen for improved strength and low WVTR. Polyethylene terephthalate (PET) may be chosen for strength and shrinkability.

Modified polyolefins, such as grafted polyolefins, may be utilized. A preferred grafted polyolefin is a maleic anhydride grafted polyolefin.

Polyolefins

Suitable LLDPE, HDPE and polypropylene may be produced by a Ziegler, single-site, or any other olefin polymerization catalyst. Ziegler catalysts and co-catalysts are well known in the art. Metallocene single-site catalysts are transition metal compounds that contain cyclopentadienyl (Cp) or Cp derivative ligands. For example, U.S. Pat. No. 4,542,199, teaches the preparation of metallocene catalysts. Non-metallocene single-site catalysts containing heteroatomic ligands, e.g., boraaryl, pyrrolyl, azaborolinyl or quinolinyl are also well known in the art.

The HDPE may also be multimodal. By "multimodal" it is meant that the polymer comprises at least two components, one of which has a relatively low molecular weight, the other a relatively high molecular weight. The multimodal polyethylene can be produced by polymerization using conditions that create a multimodal polymer product. This can be accomplished by using a catalyst system with two or more different catalytic sites or by using two or multi-stage polymerization processes with different process conditions in the different stages (e.g. different temperatures, pressures, polymerization media, hydrogen partial pressures, etc). Multimodal HDPE may be produced by a multistage ethylene polymerization, using a series of reactors, with comonomer addition in only one of the reactors.

The at least one other layer may comprise one or more materials derived from one or more renewable materials. The polyethylene or polypropylene may be derived from one or more renewable materials. The polyethylene may be prepared from ethanol derived from, for example, sugar cane, sugar beet or wheat grain. The polyethylene terephthalate may be derived from bio-polyols.

Adhesive

The at least one other layer may be fixed to the at least one layer comprising a starch composition through use of a suitable adhesive. This may assist in minimising slip and therefore maintaining excellent barrier performance. Numerous suitable adhesives would be apparent to those having skill in the present art. The adhesive may be selected to chemically bond to the at least one layer comprising a starch composition. Useful adhesives may comprise one or more polyurethanes or epoxies.

Advantageously, the use of an adhesive may overcome or minimise the need for modified or grafted other layers to be utilized as tie layers. Accordingly, for example, standard film polyethylene grades may be successfully employed as polyolefin other layers in the multi-layer film. This may be desirable from a cost consideration.

Other suitable adhesives may include EVA copolymers, acrylic copolymers and terpolymers, ionomers, metallocene derived polyethylene, maleic anhydride modified polyethylene, ethylene acrylic ester terpolymers and ethylene vinyl acetate terpolymers.

Those skilled in the art will be familiar with other adhesive lamination technology that would be suitable for adhering various types of plastics, including heat activated and UV activated systems. Exemplary adhesives may include, polyurethane, epoxy, nylon, acrylic and acrylate.

Polyurethane based adhesives may be particularly suitable for fixing the other layer to the layer comprising a starch composition. The polyurethane adhesive may be prepared in situ through reaction of one or more isocyanates with the starch layer. Through reaction of the surface hydroxyl functions of the starch with isocyanate, urethane functions are formed. Preferred isocyanates are diisocyanates. Those skilled in the art would be able to select suitable isocyanates from the wide range typically employed in the art of polyurethane synthesis.

Alternatively, the polyurethane adhesive may comprise one or more polyols. Such two component systems comprising diisocyanate and polyol are well known in the art.

The adhesives may or may not contain solvent. The solvent may be organic or water based.

Exemplary isocyanates include methylene diphenyl diisocyanate and toluene diisocyanate. Exemplary polyols include polyether polyols such as polyethylene glycol or polypropylene glycol and polyester polyols such as adipate based polyols.

Method of Preparation of the Multilayer Film

The multilayer film may be made by a variety of processes. The multilayer film may be made by co-extrusion, coating, extrusion coating, extrusion lamination and other laminating processes. The film may also be made by casting or blown film processes.

Coextrusion tends to use tie layers, and utilises modified other layers, such as modified (grafted) polyolefins. Coextrusion is generally able to achieve thinner overall gauges.

Lamination is more suitable for thicker multilayer films utilising an adhesive. Extrusion coating may produce a coated product in an in-line process. Extrusion coating can apply much thinner polymer layers of polyolefin or polyester on to a substrate using a suitable adhesive resin.

In one embodiment a three layer film is provided comprising an inner layer comprising the starch composition and two outer polyolefin layers. In other embodiments adhesive layers may be employed between the layer comprising the starch composition and the polyolefin layers thus yielding a five layer film.

In another embodiment the starch layer may be extrusion coated onto a film substrate, for example a biaxially orientated polypropylene or paper substrate and then another layer, for example, a polyolefin or polyester layer, may be extrusion coated onto the starch layer.

Applications of Multilayer Film

It will be understood by those with skill in the art that a three or five-layer film is only one of many possible embodiments that employs starch and other layers. The number of layers and their relative thicknesses may be adjusted depending on the function or end-use of the film.

Additionally, further film layers comprising other materials commonly utilized in barrier film applications may be envisaged. Exemplary further film layers include metallized films, non-polymer films and the like.

The multilayer film may have many applications including grocery bags, stretch-wraps, food packaging films, package containers, package lids where low water vapour and oxygen transmission rates are required.

The following details exemplary embodiments according to the present disclosure.

Embodiment 1

A starch composition comprising:

a) from about 60% to about 99% by weight of a first starch, said first starch comprising one or more of unmodified starch and modified starch, said first starch having a first weight average molecular weight between about 300,000 and about 4,000,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene.

Embodiment 2

A starch composition comprising:

a) from about 60% to about 99% by weight of a first starch, said first starch comprising one or more of unmodified starch and modified starch, said first starch having a first weight average molecular weight between about 300,000 and about 4,000,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene; wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 3

A starch composition comprising:

a) from about 60% to about 99% by weight of a first starch, said first starch comprising one or more of unmodified starch and modified starch, said first starch having a first weight average molecular weight between about 300,000 and about 4,000,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 3% to about 30% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 4

A starch composition comprising:

a) from about 60% to about 99% by weight of a first starch, said first starch comprising one or more of unmodified starch and modified starch, said first starch having a first weight average molecular weight between about 300,000 and about 4,000,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight, and the second starch has an amylose content of less than 20% by weight.

Embodiment 5

A starch composition comprising:

a) from about 60% to about 99% by weight of a first starch, said first starch comprising one or more of unmodified starch and modified starch, said first starch having a first weight average molecular weight between about 300,000 and about 4,000,000 Daltons;

b) from about 0.1% to about 25% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight and the second starch has an amylose content of less than 20% by weight.

Embodiment 6

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene.

Embodiment 7

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 8

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 3% to about 30% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 9

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight, and the second starch has an amylose content of less than 20% by weight.

Embodiment 10

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 25% by weight of a second starch, said second starch comprising one or more of unmodified and modified starch, said second starch having a second weight average molecular weight between about 1,000 and about 290,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight and the second starch has an amylose content of less than 20% by weight.

Embodiment 11

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 100,000 and about 290,000 Daltons; and c) from about 1% to about 40% by weight of at least one water-soluble polymer comprising one or more of polyvinyl alcohol, polyvinyl acetate and polyoxyalkylene.

Embodiment 12

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 100,000 and about 290,000 Daltons; and c) from about 1% to about 40% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 13

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 100,000 and about 290,000 Daltons; and c) from about 3% to about 30% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 14

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 100,000 and about 290,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight, and the second starch has an amylose content of less than 20% by weight.

Embodiment 15

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 25% by weight of a second starch, said second starch comprising one or more of unmodified and modified starch, said second starch having a second weight average molecular weight between about 100,000 and about 290,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight and the second starch has an amylose content of less than 20% by weight.

Embodiment 16

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 10,000 and about 100,000 Daltons; and c) from about 1% to about 40% by weight of at least one water-soluble polymer comprising one or more of polyvinyl alcohol, polyvinyl acetate and polyoxyalkylene.

Embodiment 17

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 10,000 and about 100,000 Daltons; and c) from about 1% to about 40% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 18

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 10,000 and about 100,000 Daltons; and c) from about 3% to about 30% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

Embodiment 19

A starch composition comprising:

a) from about 60% to about 99% by weight of a first starch, said first starch comprising one or more of unmodified starch and modified starch, said first starch having a first weight average molecular weight between about 300,000 and about 800,000 Daltons;

b) from about 0.1% to about 40% by weight of a second starch, said second starch comprising one or more of unmodified and modified starch, said second starch having a second weight average molecular weight between about 10,000 and about 100,000 Daltons; and c) from about 1% to about 40% by weight of at least one water-soluble polymer comprising one or more of polyvinyl alcohol, polyvinyl acetate and polyoxyalkylene.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight, and the second starch has an amylose content of less than 20% by weight.

Embodiment 20

A starch composition comprising:
a) from about 60% to about 99% by weight of a first starch, said first starch comprising one or more of unmodified starch and modified starch, said first starch having a first weight average molecular weight between about 300,000 and about 800,000 Daltons;
b) from about 0.1% to about 25% by weight of a second starch, said second starch comprising one or more of unmodified and modified starch, said second starch having a second weight average molecular weight between about 10,000 and about 100,000 Daltons; and
c) from about 1% to about 40% by weight of at least one water-soluble polymer comprising one or more of polyvinyl alcohol, polyvinyl acetate and polyoxyalkylene;

wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight;

or wherein the first starch has an amylose content of greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight and the second starch has an amylose content of less than 20% by weight.

Embodiment 21

A starch composition according to any one of embodiments 1 to 20, wherein the first starch is present in an amount from about 70% to about 99% by weight, or from about 75% to about 99% by weight, or from about 80% to about 99% by weight, or from about 85% to about 99% by weight, or from about 90% to about 99% by weight, or from about 95% to about 99% by weight and the second starch is present in an amount from about 0.1% to about 35% by weight, or from about 0.2% to about 30% by weight, or from about 0.5% to about 25% by weight, or from about 0.5% to about 20% by weight, or from about 0.5% to about 15% by weight, or from about 0.5% to about 10% by weight, or from about 0.5% to about 5% by weight, or from about 0.5% to about 4% by weight, or from about 0.5% to about 3% by weight, or from about 0.5% to about 2% by weight.

Embodiment 22

A film, said film having a thickness between 5 and 600 microns, said film comprising a starch composition as disclosed in any one of Embodiments 1 to 21;

wherein the film has an OPC of less than 0.07 $cm^3 \cdot mm/m^2 \cdot day \cdot atm$ measured at 50% RH according to ASTM F1297.

Embodiment 23

A film, said film having a thickness between 5 and 600 microns, said film comprising a starch composition as disclosed in any one of Embodiments 1 to 20; wherein the film has an OPC of less than 0.06 $cm^3 \cdot mm/m^2 \cdot day \cdot atm$ measured at 50% RH according to ASTM F1297.

Embodiment 24

A film, said film having a thickness between 5 and 600 microns, said film comprising a starch composition as disclosed in any one of Embodiments 1 to 20; wherein the film has an OPC of less than 0.05 $cm^3 \cdot mm/m^2 \cdot day \cdot atm$ measured at 50% RH according to ASTM F1297.

In any one of embodiments 21 to 24 the film may have an OPC of less than 0.02 $cm^3 \cdot mm/m^2 \cdot day \cdot atm$, or less than 0.01 $cm^3 \cdot mm/m^2 \cdot day \cdot atm$, or less than 0.005 $cm^3 \cdot mm/m^2 \cdot day \cdot atm$ according to ASTM F1927 measured at 50% relative humidity.

There is also provided a multilayer film comprising one or more layers comprising a film according to any one of embodiments 21 to 24 and at least one other layer selected from the group consisting of polyolefin, polyethylene terephthalate, polyethylene terephthalate glycol, polybutylene succinate, polyhydroxy butyrate, polylactic acid, nylon, polyvinylchloride, polyvinylidene dichloride, cellulose, a water-resistant protein layer, a water-resistant layer comprising silica and combinations thereof.

Examples

Raw Materials

The following raw materials were used in the Examples.

Modified starch ECOFILM™; a propylene oxide modified starch, 70% amylose content; Ingredion.

Modified starch National 7; a propylene oxide modified starch, <20% amylose content; Ingredion.

Modified starch Bondstar T800; a propylene oxide modified starch, <20% amylose content; Ingredion.

Unmodified starch Pencote D ULV; <1% amylose content; Ingredion.

Modified starch National 912; an OSA (octenyl succinic anhydride) modified starch, <20% amylose content; Ingredion.

Polyvinylalcohol; (Elvanol™ 71-30; Kuraray)

Cloisite 20A hydrophobically modified layered silicate clay (BYK Chemie GmbH).

Table 1 contains data on the five starches used in the Examples.

TABLE 1

| Starch | Amylose (wt %) | Modification[1] | Method to reduce MW | Starch source | Mw (GPC)[2] |
|---|---|---|---|---|---|
| Ecofilm | 70 | HP | — | Corn | 450,000 |
| National 7 | <20 | HP | — | Tapioca | 1,100,000 |
| BONDSTAR T800 | <20 | HP | Hypochlorous acid | Tapioca | 190,000 |
| Pencote D ULV | <1 | None | Enzyme | Waxy corn | 31,000 |
| National 912 | <20 | OSA | Acid | Corn | 230,000 |

[1]HP = hydroxypropylated
[2]determined using gel permeation chromatography.

Starch Compositions

Starch compositions 1 to 5 were prepared by extrusion processing a mixture of starch (A), starch (B) and PVOH (Table 2). Comparative example 1 also contained 1.8% by weight clay based on the total weight of the starch composition. The weight ratios of the starches and PVOH are based on the total weight of these three components. The % LMW starch is based on the weight of LMW starch relative to the total weight of starch in the composition. Starch compositions 6 to 9 were similarly prepared by extrusion processing but only contained either Ecofilm or National 7 as the single starch component (Table 3).

TABLE 2

| Composition | Starch (A) | Starch (B) | PVOH (C) | Weight ratio (A/B/C) | % LMW starch | Clay % |
|---|---|---|---|---|---|---|
| 1 (comparative) | Ecofilm | National7 | Elvanol 71-30 | 68.3/22.7/9.0 | N/A | 1.8 |
| 2 | Ecofilm | Bondstar T800 | | 81.9/9.1/9.0 | 10 | N/A |
| 3 | Ecofilm | Bondstar T800 | | 68.3/22.7/9.0 | 25 | |
| 4 | Ecofilm | Pencote D ULV | | 90.1/0.9/9.0 | 1 | |
| 5 | Ecofilm | Pencote D ULV | | 86.4/4.6/9.0 | 5 | |

TABLE 3

| Composition (comparative) | Starch ca. 89 wt. % | PVOH ca. 9 wt. % | Clay ca. 2 wt. % |
|---|---|---|---|
| 6 | Ecofilm | Elvanol 71-30 | Cloisite 20A |
| 7 | Ecofilm | Elvanol 71-30 | N/A |
| 8 | National7 | Elvanol 71-30 | Cloisite 20A |
| 9 | National 7 | Elvanol 71-30 | N/A |

The extruded starch compositions were processed into films having a thickness indicated in Table 4. The Table also collects oxygen barrier and mechanical property data for the films. Oxygen transmission rate of the films of the starch compositions was measured according to ASTM F1927 at 50% relative humidity.

TABLE 4

| | Oxygen Barrier | | | Tensile | | Film impact (mN/μm) | |
|---|---|---|---|---|---|---|---|
| | OTR ($cc/m^2 \cdot day \cdot atm$) 23° C. | Thickness | OPC ($cc \cdot mm/m^2 \cdot day \cdot atm$) 23° C. | Elastic modulus | Elongation at break (%) | | |
| Composition | 50% RH | (μm) | 50% RH | (MPa) | (23° C.) | Ave. | Dev. |
| 1 (comparative) | 0.72 | 100 | 0.072 | 2411 | 18 | 5.8 | 0.9 |
| 2 | 0.42 | 100 | 0.042 | 2497 | 11 | 4.0 | 3.4 |
| 3 | 0.38 | 80 | 0.030 | 2542 | 4 | 0.7 | 0.2 |
| 4 | 0.44 | 90 | 0.040 | 2570 | 22 | 10.5 | 4.1 |
| 5 | 0.32 | 100 | 0.032 | 2528 | 18 | 1.7 | 0.6 |
| 6 (comparative | 0.30 | 264 | 0.079 | — | — | — | — |
| 7 (comparative) | 0.20 | 268 | 0.054 | — | — | — | — |
| 8 (comparative) | 0.24 | 257 | 0.062 | — | — | — | — |
| 9 (comparative) | 0.27 | 252 | 0.068 | — | — | — | — |

The results demonstrate that inventive compositions 2 through 4 which comprise added low molecular weight starch components afforded films having superior oxygen barrier properties. Furthermore, as the molecular weight of the low molecular weight starch component decreased (compositions 4 and 5) less low molecular weight component was required in order to attain improved gas barrier performance. Comparative examples 1 and 6 to 9, which either comprise only a single high molecular weight starch component or a mixture of high molecular weight starch components, all show poorer oxygen barrier performance.

Film impact was measured according to ASTM D3420 at 23° C. and 50% relative humidity on an unformed sheet of the starch composition.

Thermoformability of Starch Films

Further starch compositions 10 to 12 and comparative example 13 were prepared (for composition see Table 5), extruded and processed into films, by analogous methods to those described above for starch compositions 1 to 5 and comparative examples 6 to 9.

TABLE 5

| Composition | Starch (A) | Starch (B) | Weight ratio (A/B) | % LMW starch | Film Thickness (μm) |
|---|---|---|---|---|---|
| 10 | Ecofilm | Pencote D ULV | 9:1 | 10 | 118 |

TABLE 5-continued

| Composition | Starch (A) | Starch (B) | Weight ratio (A/B) | % LMW starch | Film Thickness (μm) |
|---|---|---|---|---|---|
| 11 | Ecofilm | National 912 | 9:1 | 10 | 139 |
| 12 | Ecofilm | Bondstar T800 | 9:1 | 10 | 102 |
| 13 (Comparative) | Ecofilm | | | N/A | 414 |

Thermoformability of starch films is associated with tensile elongation at break at elevated temperature. The above films were evaluated for their tensile elongation at break at 100° C. by using 15 mm wide strips of the starch films encased in a PET laminate. Tensile elongation at break is measured in % (% of elongation vs initial size when yield point is reached). Tensile speed was 500 mm/min. The % elongation at break results at 100° C. are shown in Table 6.

TABLE 6

| Composition | Elongation at break (%) |
|---|---|
| 10 | 85 |
| 11 | 98 |
| 12 | 75 |
| 13 (Comparative) | 62 |

The results show that starch films containing a high molecular weight and a low molecular weight starch have improved elongation at break at 100° C. compared with a film containing only a high molecular weight starch.

Drawability of Starch Films

The drawability of extruded starch film sheets was evaluated by forming into cups of different geometry on a thermoforming machine. The composition of the starch films is shown in Table 7.

TABLE 7

| Composition | Starch (A) | Starch (B) | PVOH (C) | Weight ratio (A/B/C) | % LMW starch | Extrusion Speed (rpm) | Film Thickness (μm) |
|---|---|---|---|---|---|---|---|
| 14 | Ecofilm | Pencote D ULV | PVOH | 87.7:1.8:10.5 | 2 | 620 | 120 |
| 15 | Ecofilm | Pencote D ULV | PVOH | 87.7:1.8:10.5 | 2 | 920 | 120 |
| 16 (Comparative) | Ecofilm | N/A | Elvanol 71-30 | 90.5:9:0.5 | N/A | 620 | 120 |
| 17 (Comparative) | Ecofilm | N/A | Elvanol 71-30 | 90.5:9:0.5 | N/A | 920 | 120 |

A 12 cavity draw ratio tool was used, having 12 individual cups of the same 50 mm diameter, but which are progressively deeper (from 25 mm to 50 mm) and there are two sets of cups with different radius in the bottom corner (4 mm radius and 8 mm radius). A large radius is less severe when drawn and so the 8 mm radius normally draws more easily than the 4 mm radius cavity. Use of the draw ratio tool gives an area draw ratio from 3.0 to 5.0, depending on the cavity.

For each film composition tested, approximately 5 meters length of sheet of minimum width 300 mm was used. Ten sample sheets were tested for each film composition. The sample sheets were heated, and formed using the cavity draw ratio tool.

For each sheet sample, the number of cavities successfully formed was recorded. This was repeated for the ten samples The cavity number from the draw ratio tool is correlated with grading percentage as follows:

TABLE 8

| Cavity No. | Depth (mm) | Corner Radius (mm) | Grading % | Area Draw Ratio |
|---|---|---|---|---|
| 1 | 25 | 8 | 50%-8 | 3.0 |
| 2 | 25 | 4 | 50%-4 | 3.0 |
| 3 | 30 | 8 | 60%-8 | 3.4 |
| 4 | 30 | 4 | 60%-4 | 3.4 |
| 5 | 35 | 8 | 70%-8 | 3.8 |
| 6 | 35 | 4 | 70%-4 | 3.8 |
| 7 | 40 | 8 | 80%-8 | 4.2 |
| 8 | 40 | 4 | 80%-4 | 4.2 |
| 9 | 45 | 8 | 90%-8 | 4.6 |
| 10 | 45 | 4 | 90%-4 | 4.6 |
| 11 | 50 | 8 | 100%-8 | 5.0 |
| 12 | 50 | 4 | 100%-4 | 5.0 |

The results for compositions 14-15 and comparators 16 and 17 are shown in Table 9.

TABLE 9

| Composition | Cavity No./Grading %/No of cavities successfully formed |
|---|---|
| 14 | 4/60%-4/10 cavities<br>3/60%-8/10 cavities |
| 15 | 4/60%-4/10 cavities<br>3/60%-8/10 cavities |
| 16 (Comparative) | 4/60%-4/8 cavities<br>3/60%-8/10 cavities |
| 17 (Comparative) | 4/60%-4/2 cavities<br>3/60%-8/10 cavities |

The results show that starch films containing a high molecular weight and a low molecular weight starch have improved draw compared with a film containing only a high molecular weight starch.

The contents of all references, including published patents and patent applications cited throughout the application are hereby incorporated by reference.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A starch composition comprising:

a. from about 60% to about 99% by weight of a first starch, said first starch comprising one or more of unmodified starch and modified starch, said first starch having a first weight average molecular weight between about 300,000 and about 4,000,000 Daltons;

b. from about 0.1% to about 40% by weight of a second starch, said second starch comprising one or more of unmodified and modified starch, said second starch having a second weight average molecular weight between about 1,000 and about 290,000 Daltons; and c. from about 0.5% to about 40% by weight of at least one water soluble polymer comprising one or more of polyvinyl alcohol, polyvinyl acetate and polyoxyalkylene, wherein the molecular weight distribution of the starch composition is greater than 6.5.

2. The starch composition according to claim 1, wherein the first starch is present in an amount from about 70% to about 99% by weight, and/or the second starch is present in an amount from about 0.1% to about 35% by weight.

3. The starch composition according to claim 1, wherein the water-soluble polymer is present in an amount from about 3% to about 30% by weight.

4. The starch composition according to claim 1, wherein the water-soluble polymer comprises one or more of polyvinyl alcohol and polyoxyalkylene.

5. The starch composition according to claim 1, wherein the first weight average molecular weight is between about 300,000 and about 3,500,000 Daltons.

6. The starch composition according to claim 1, wherein the second weight average molecular weight is between about 10,000 and about 290,000 Daltons.

7. The starch composition according to claim 6, wherein:

a. the second weight average molecular weight is between about 10,000 and about 50,000 Daltons; or b. the second weight average molecular weight is between about 100,000 and about 290,000 Daltons.

8. The starch composition according to claim 1, wherein the amylose content of the first or second starches is, independently, greater than about 10% by weight.

9. The starch composition according to claim 8, wherein the amylose content of the first or second starches is, independently, from about 50% to about 80% by weight.

10. The starch composition according to claim 1, wherein the amylose content of the second starch is less than about 20% by weight.

11. The starch composition according to claim 1, wherein the second starch is a starch which has been treated with an enzyme or with an acid to reduce molecular weight.

12. The starch composition according to claim 1, wherein the modified starch is chemically modified so as to replace hydroxyl functionality with functionality selected from the group consisting of ethers, esters and mixtures thereof.

13. The starch composition according to claim 1, wherein the modified starch is chemically modified to include a hydroxyalkyl $C_{2-6}$ group or modified by reaction with an anhydride of a carboxylic acid.

14. The starch composition according to claim 1, wherein the modified starch is chemically modified so as to have a degree of substitution from 0.01 to 1.5.

15. The starch composition according to claim 1, wherein the first starch comprises more than one starches and/or modified starches.

16. The starch composition according to claim 1, wherein the second starch comprises more than one starches and/or modified starches.

17. A film comprising a starch composition according to claim 1.

18. The film according to claim 17, wherein the film has an oxygen permeation coefficient of less than 0.05 $cm^3$ $mm/m^2 \cdot 24$ h·atm at 50% relative humidity (RH), when measured according to ASTM F1927.

19. A method of making a starch composition according to claim 1, the method comprising the step of contacting the first starch, the second starch and the water-soluble polymer under melt processing conditions.

* * * * *